United States Patent
Braeuer et al.

(10) Patent No.: US 7,480,545 B2
(45) Date of Patent: Jan. 20, 2009

(54) METHOD AND DEVICE FOR DETECTING THE INITIATION OF THE DRIVING OFF PROCESS BY A DRIVER OF A VEHICLE

(75) Inventors: Karsten Braeuer, Hollenstedt (DE); Michael Schopper, Stuttgart (DE); Davide Tondelli, Novellara (IT)

(73) Assignee: Daimler AG, Stuttgart (DE)

( * ) Notice: Subject to any disclaimer, the term of this patent is extended or adjusted under 35 U.S.C. 154(b) by 480 days.

(21) Appl. No.: 10/545,546

(22) PCT Filed: Dec. 16, 2003

(86) PCT No.: PCT/EP03/14310

§ 371 (c)(1),
(2), (4) Date: Aug. 12, 2005

(87) PCT Pub. No.: WO2004/071833

PCT Pub. Date: Aug. 26, 2004

(65) Prior Publication Data

US 2006/0224277 A1    Oct. 5, 2006

(30) Foreign Application Priority Data

Feb. 15, 2003   (DE) ............................... 103 06 363

(51) Int. Cl.
*G06F 17/00* (2006.01)
(52) U.S. Cl. .......................................................... 701/1
(58) Field of Classification Search ................ 701/1, 701/70
See application file for complete search history.

(56) References Cited

U.S. PATENT DOCUMENTS

| | | | |
|---|---|---|---|
| 4,629,043 A | 12/1986 | Matsuo et al. | |
| 4,892,014 A | 1/1990 | Morell et al. | |
| 5,417,624 A | 5/1995 | Weissbrich et al. | |
| 5,911,646 A | 6/1999 | Tsutsui et al. | |
| 5,916,062 A | 6/1999 | Siepker | |
| 6,009,984 A | 1/2000 | Zechmann et al. | |
| 6,086,515 A | 7/2000 | Buschmann et al. | |
| 6,269,289 B1 * | 7/2001 | Toukura et al. | ................ 701/1 |
| 6,738,703 B2 | 5/2004 | Ewinger et al. | |
| 6,769,399 B2 | 8/2004 | Darnell | |
| 6,920,383 B2 | 7/2005 | Graf et al. | |
| 6,951,528 B2 | 10/2005 | Ewinger et al. | |
| 2002/0033642 A1 | 3/2002 | Holl | |
| 2003/0214186 A1 | 11/2003 | Kinder et al. | |

(Continued)

FOREIGN PATENT DOCUMENTS

DE   19621628   12/1997

(Continued)

*Primary Examiner*—Yonel Beaulieu
(74) *Attorney, Agent, or Firm*—W. F. Fasse; W. G. Fasse

(57) ABSTRACT

A method and a device are for detecting the initiation of the driving off process by a driver of a vehicle. The time derivatives of the engine torque and of the engine speed are determined, and the initiation of the driving off process is then inferred from an evaluation of these time derivative values. The detection of the driving off process can be used for releasing a brake while avoiding unintentional rolling of the vehicle when making a hill start.

13 Claims, 2 Drawing Sheets

U.S. PATENT DOCUMENTS

| | | |
|---|---|---|
| 2004/0147368 A1 | 7/2004 | Diebold et al. |
| 2005/0246081 A1 | 11/2005 | Bonnet et al. |
| 2006/0145533 A1 * | 7/2006 | Braeuer et al. .............. 303/191 |

FOREIGN PATENT DOCUMENTS

| | | |
|---|---|---|
| DE | 19917437 | 10/2000 |
| DE | 10063061 | 6/2002 |
| DE | 10131291 | 11/2002 |
| JP | 6137415 | 5/1994 |
| JP | 7101319 | 4/1995 |

\* cited by examiner

METHOD AND DEVICE FOR DETECTING THE INITIATION OF THE DRIVING OFF PROCESS BY A DRIVER OF A VEHICLE

FIELD OF THE INVENTION

The invention relates to a method and a device for detecting the initiation of the driving off process by a driver of a vehicle, wherein at least one variable to be evaluated is sensed and the initiation of the driving off process is then inferred from said variable.

BACKGROUND INFORMATION

Such methods and devices are used, for example, within the scope of driving off assistance devices and/or driving off assistance methods which prevent unintentional rolling of the vehicle when it is driven off. As soon as the driver initiates the driving off process, the brake pressure and brake force in the wheel brake devices are then automatically reduced and the vehicle drives off without rolling back inadvertently.

A method and a device of the type mentioned at the beginning are known, for example, from DE 196 21 628 A1. In this context, the initiation of the driving off process by the driver is detected using the position of the clutch pedal or the brake pedal. If the driver moves the clutch pedal or the brake pedal back out of the actuated position, it is inferred that the driving off process is being initiated.

The disadvantage here is that detection of the initiation of the driving off process can be used only in driving off assistance methods and/or driving off assistance devices in which the brake pedal or the clutch pedal is activated by the driver in the stationary state of the vehicle before the driving off process is initiated. However, there are also driving off methods in which the brake pressure in the wheel brake devices is automatically maintained by the driving off process while the vehicle is in a stationary state without the pedal being activated.

Another method and device of the type mentioned at the beginning are known, for example from DE 100 63 061 A1. In that document, a driving off process is inferred, if, firstly the current engine torque is sufficient to drive off the vehicle from the stationary state, and secondly the current engine torque or the engine torque requested by the driver increases, and thirdly the average increase in the engine torque over time lies in a predefined range, for example between 1% and 60%.

SUMMARY OF THE INVENTION

The object of the present invention is therefore to improve a method of the type mentioned at the beginning and a device for carrying out this method to the effect that the method and/or the device can be used independently of the specific configuration of the driving off method, and that the method and/or the device detects the driving off request particularly reliably.

This object is achieved according to the features of the invention defined in the appended claims.

The engine torque and/or the engine speed and/or a variable which is correlated with at least one of these variables is used as variable to be evaluated. During the transition phase between idling and the completely enclosed load torque (for example when a friction clutch in variable speed gearboxes is completely closed), the engine speed and engine torque have a characteristic profile from which a driving off request can be detected. The initiation of the driving off process—which constitutes the start of the driving process—is detected here irrespective of how and in what sequence the driver operates the pedals or other operator controls in the vehicle. The engine torque and the engine speed are available in modern vehicles as electrical signals on the vehicle bus (for example CAN bus) so that when these variables are used the invention can be implemented in a particularly simple and cost effective way without additional sensor means.

The initiation of the driving off process can be easily detected by virtue of the fact that the at least one variable to be evaluated and/or the variable which is correlated with the at least one variable to be evaluated lies in a predefined value range.

It is advantageous if the checking whether the at least one variable to be evaluated lies within the predefined value range is carried out cyclically and the initiation of the driving off process is not detected until this has repeatedly been the case in succession. On the basis of this measure it is possible to increase the reliability of detection of the initiation of the driving off process. Brief peaks in the variable to be evaluated or the variable which is correlated therewith, which are caused by a fault, are then not misinterpreted.

The driving off request is detected particularly reliably by virtue of the fact that the time derivative of the engine torque is greater than or equal to a predefinable engine torque change threshold value and at the same time the time derivative of the engine speed is less than or equal to a predefinable negative engine speed change threshold value. The driving off request is thus detected.

The values of the engine torque (M) and/or the engine speed (N) are expediently prefiltered before the derivation over time, in particular by means of the polynomial moving average method, as a result of which large errors in the values of the respective time derivative can be avoided.

BRIEF DESCRIPTION OF THE DRAWINGS

The method according to the invention and/or the device according to the invention are explained below in more detail with reference to the appended drawing, in which.

DETAILED DESCRIPTION OF A PREFERRED EXAMPLE EMBODIMENT OF THE INVENTION

Figure 1:
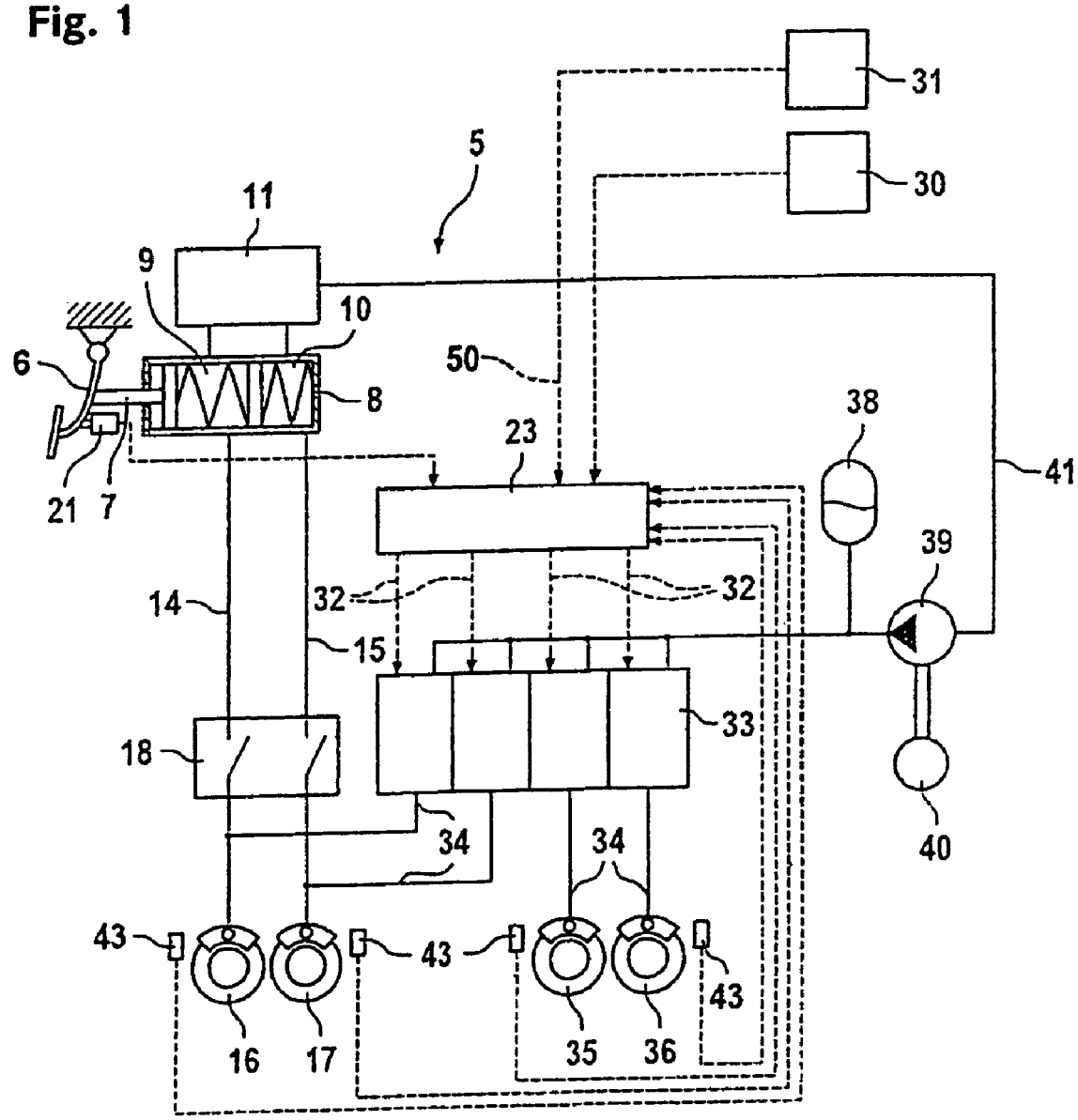
FIG. 1 shows an exemplary embodiment of a brake device with a device according to the invention for detecting the initiation of a driving off process in a schematic illustration.

FIG. 1 shows a brake device 5 which is embodied as an electrohydraulic brake device. A brake pedal 6 is connected via a brake pedal linkage 7 to a tandem master brake cylinder 8 in a manner known per se. The tandem master brake cylinder 8 has two fluidically separated working chambers 9, 10 to each of which brake fluid from a reservoir vessel 11 is fed.

The two working chambers 9, 10 can be fluidically connected directly to the two wheel brake devices 16, 17 of the front axle by one emergency brake line 14, 15 each. This fluidic connection is made if a valve arrangement 18, which is inserted into the emergency brake lines 14, 15 is switched over into its emergency switched position and opens the respective fluidic connections. The valve arrangement 18 is switched over into its emergency switched position whenever a defect occurs in the electrical open-loop or closed-loop control of the electrohydraulic brake device 5.

A brake light switch 21 is provided in a manner known per se and generates a brake light signal BLS which is transmitted to a control device 23.

As an alternative to the brake light switch 21, the brake light signal BLS can also be generated by signals from other vehicle devices. For example by means of pedal travel sensor signals and/or master-brake-cylinder brake pressure signals, that is to say all the signals from which activation of a brake pedal can be determined.

At this point it is to be noted that, for the purpose of better differentiation, the electrical lines in FIG. 1 are illustrated by dashed lines while the fluid lines are illustrated by unbroken lines.

In the preferred embodiment according to FIG. 1, an inclination sensor 13 which measures the inclination of the carriageway in the longitudinal direction of the vehicle and transmits it to the control device 23 by means of an electrical signal line is also provided.

An engine controller 31 also transmits to the control device 23 the values of the current engine speed N and the current engine torque M which is determined in the engine controller 31 using an estimation method which is known per se. For example, the engine controller 31 is connected to a vehicle bus 50 on which the corresponding signals of the engine speed N and the engine torque M are present and can be received or tapped by the control device 23 and other vehicle systems.

The control device 23 actuates a brake pressure modulation unit 33 via four control lines 32. The brake pressure modulation unit 33 is connected fluidically to the wheel brake devices 16, 17, 35, 36 via one brake line 34 each so that the brake pressure in each wheel brake device 16, 17, 35, 36 can be set on a wheel-specific basis. At the input end, brake fluid at high pressure is supplied to the brake pressure modulation unit 33 from a high pressure accumulator 38. The high pressure accumulator 38 and the input end of the brake pressure modulation unit 33 are connected to the output end of a pump 39 which is driven by an electric motor 40 and supplies the high pressure accumulator 38 or the brake pressure modulation unit 33 with pressurized brake fluid. The intake end of the pump 39 is fluidically connected to the reservoir vessel 11 via a supply line 41.

The brake device 5 has an automatic stationary state detector means. For this purpose, the control device 23 is supplied with the wheel speed signals, measured by a wheel speed sensor 43, for at least one wheel via an electrical line. In the preferred exemplary embodiment according to FIG. 1, the wheel speed signals of all the wheels are measured by means of one wheel speed sensor 43 each and passed on to the control device 23. The stationary state of the vehicle can be detected from the wheel speed signals in a manner per se, which is relevant for the activation of the driving off assistance mode of the brake device.

In a driving off assistance method, the vehicle is automatically held in the stationary state, for example by virtue of the fact that the brake pressure in the wheel brake devices 16, 17, 35, 36 is maintained. The brake pressure in the wheel brake devices 16, 17, 35, 36 is reduced, in order to permit driving off, only if a driving off process is occurring. This requires reliable detection of the initiation or the start of the driving off process in order to avoid incorrect release of the wheel brake devices. The reliable detection of the driving off process is achieved by means of the method according to the invention which is explained in more detail below.

In the preferred exemplary embodiment, the time derivative $\dot{M}$ of the engine torque M and the time derivative $\dot{N}$ of the engine speed N are used as characteristic variables. During the transition phase between idling and the completely enclosed load torque (for example when the friction clutch in variable speed gearboxes is completely closed), the engine speed N or engine torque M have a characteristic profile from which a driving off process can be detected.

When a driver drives off with a vehicle with a friction clutch and a variable speed gearbox, he firstly opens the throttle so that the engine speed N rises. Immediately subsequent to this the driver begins to close the clutch in order to adapt the engine speed N and the drive shaft speed slowly to one another. In the process, the engine speed N drops and the engine torque M rises. A driving off process is inferred if the time derivative $\dot{M}$ of the engine torque M of the vehicle is greater than or equal to a predefined positive engine torque change threshold value $\dot{M}_0$ and at the same time the time derivative $\dot{N}$ of the engine speed N is equal to or less than a predefined negative engine speed change threshold value $\dot{N}_0$. If this is the case, the brake pressure p in the wheel brake devices 16, 17, 35, 36 is reduced to zero.

For example, a driving off process is detected only if the interrogated, abovementioned conditions ($\dot{M} \geq \dot{M}_0$ and $\dot{N} \leq \dot{N}_0$) during a predefined time period or during a predefined number of interrogation cycles—for example two to five interrogation cycles—are carried out without interruption. As a result, faulty driving off process detections can be reduced further.

Furthermore, in a modification of the illustrated preferred embodiment, additional variables such as the engine speed, the engine torque or the position of the accelerator pedal can be taken into account in the interrogation of the driving off process.

The time derivatives $\dot{M}$ and $\dot{N}$ of the engine torque M and the engine speed N are calculated in the control device 23. For this purpose, firstly both the value of the engine torque M and the value of the engine speed N are filtered in order to reduce faults in the time derivatives. The filtering is carried out, for example, by means of the "moving average method" which is known per se, and in which a weighted formation of average values is carried out using the respective four to seven last values. As a result, a type of low pass filtering is brought about and fluctuations are compensated. The time derivatives are only calculated subsequently in the control device 23 by means of numerical differentiation.

Figure 2:
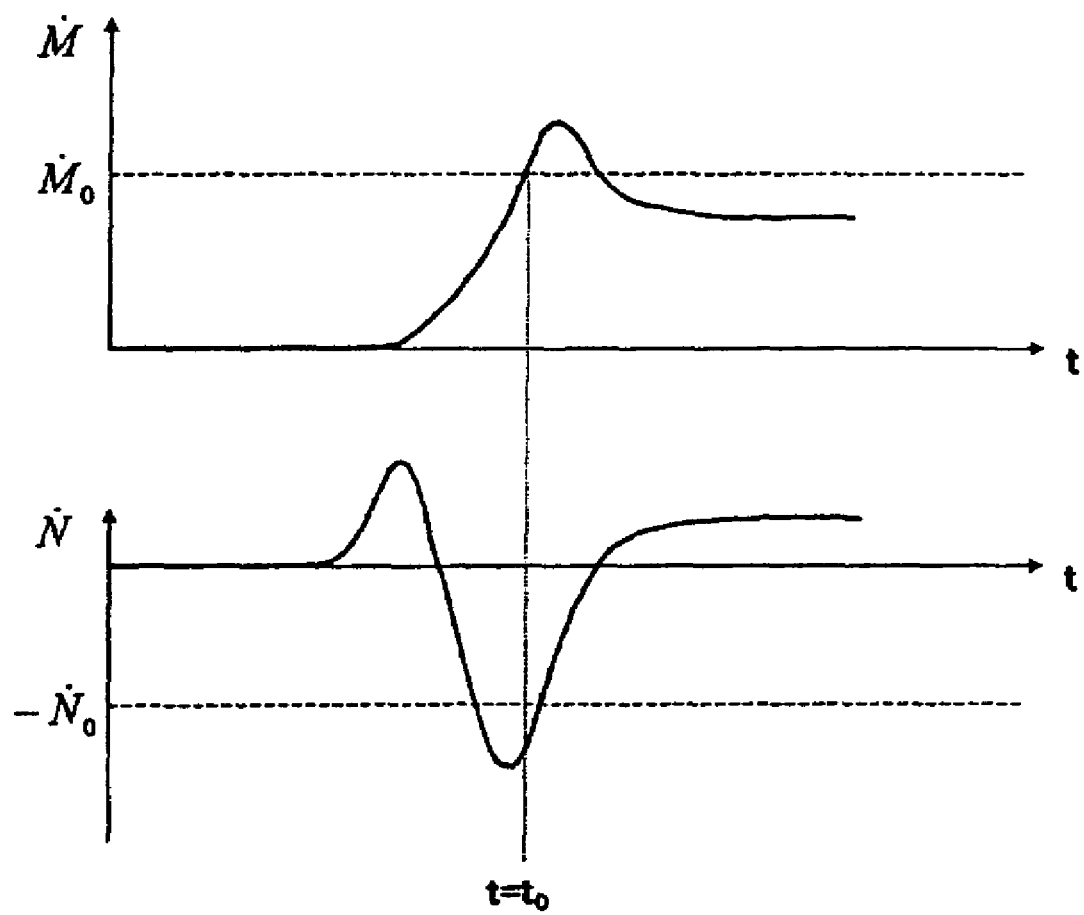
FIG. 2 shows an exemplary profile of the time derivative of the engine torque and of the engine speed as a function of time.

In FIG. 2, the exemplary profile of the time derivatives $\dot{M}$ and $\dot{N}$ is illustrated. When the driver drives off he firstly opens the throttle to a certain extent (activation of the accelerator pedal) as a result of which the engine speed rises and therefore the time derivative $\dot{N}$ of the engine speed N also rises. If the engine torque is then transmitted to the driven wheels—by closing the clutch in a vehicle with a friction clutch—the engine torque M and its time derivative $\dot{M}$ rise. In the process, the engine speed N drops so that the time derivative of the engine speed $\dot{N}$ becomes negative and drops below the negative engine speed change threshold value $-\dot{N}_0$.

At the time $t_0$, the time derivative $\dot{M}$ of the engine torque M reaches or exceeds the positive engine torque change threshold value $\dot{M}_0$, in which case the time derivative $\dot{N}$ of the engine speed N is already less than the negative engine speed change threshold value $\dot{N}_0$ at this time. If this state occurs uninterruptedly for a plurality of interrogation cycles, the initiation or the start of the driving off process is detected.

For the driving off assistance method this means that the brake pressure in the wheel brake devices 16, 17, 35, 36 can be reduced at the time $t_0$.

The invention claimed is:

1. A method for detecting the initiation of the driving off process by a driver of a vehicle, wherein at least the time derivative ($\dot{M}$) of the engine torque (M) and the time derivative ($\dot{N}$) of the engine speed (N) are sensed as variables ($\dot{M}$, $\dot{N}$) to be evaluated and the initiation of the driving off process is then inferred from said variables ($\dot{M}$, $\dot{N}$), characterized in that the initiation of the driving off process is detected based on an evaluation result that the time derivative ($\dot{M}$) of the engine torque (M) is greater than or equal to a predefinable engine torque change threshold value ($\dot{M}_0$) and at the same time the time derivative ($\dot{N}$) of the engine speed (N) is less than or equal to a predefinable negative engine speed change threshold value ($-\dot{N}_0$).

2. The method as claimed in claim 1, characterized in that the values of the engine torque (M) and/or of the engine speed (N) are prefiltered before the derivation over time.

3. The method as claimed in claim 2, characterized in that the prefiltering is carried out by a polynomial moving average method.

4. A device for carrying out the method as claimed in claim 1, having a determining device for determining at least the time derivative ($\dot{M}$) of the engine torque (M) and the time derivative ($\dot{N}$) of the engine speed (N) as variables ($\dot{M}$, $\dot{N}$) which are to be evaluated and from which the presence of the driving off request is inferred, and having evaluation means (23) for evaluating the variables ($\dot{M}$, $\dot{N}$) to be evaluated, characterized in that the initiation of the driving off process is detected based on an evaluation result that the time derivative ($\dot{M}$) of the engine torque (M) is greater than or equal to a predefinable engine torque change threshold value ($\dot{M}_0$) and at the same time the time derivative ($\dot{N}$) of the engine speed (N) is less than or equal to a predefinable negative engine speed change threshold value ($-\dot{N}_0$).

5. A method of detecting a driving-start process of a motor vehicle that is starting to drive under control by a driver, comprising the steps:
   a) providing a predefined engine torque change threshold value;
   b) providing a predefined negative engine speed change threshold value;
   c) determining an engine torque of an engine of the motor vehicle;
   d) determining an engine rotational speed of the engine;
   e) forming an engine torque time derivative over time of said engine torque or of a first variable indicative of said engine torque;
   f) forming an engine speed time derivative over time of said engine rotational speed or of a second variable indicative of said engine rotational speed;
   g) comparing said engine torque time derivative to said predefined engine torque change threshold value;
   h) comparing said engine speed time derivative to said predefined negative engine speed change threshold value;
   i) if said engine torque time derivative is greater than or equal to said predefined engine torque change threshold value, and said engine speed time derivative is less than or equal to said predefined negative engine speed change threshold value, then in response thereto and based thereon, detecting the occurrence of the driving-start process of the motor vehicle.

6. The method according to claim 5, further comprising pre-filtering values of said engine torque and of said engine rotational speed to produce said first variable and said second variable respectively before said steps e) and f), and then in said steps e) and f) forming said time derivatives of said first and second variables respectively.

7. The method according to claim 6, wherein said pre-filtering comprises performing filtering using a polynomial moving average method.

8. The method according to claim 5, further comprising carrying out said steps c), d), e), f), g), h) and i) repeatedly in plural interrogation cycles over time, and wherein said step i) results in detecting the occurrence of the driving-start process only if both said engine torque time derivative is greater than or equal to said predefined engine torque change threshold value and said engine speed time derivative is less than or equal to said predefined negative engine speed change threshold value during at least one same interrogation cycle among said plural interrogation cycles.

9. The method according to claim 8, wherein said at least one same interrogation cycle comprises a plurality of successive ones of said interrogation cycles.

10. The method according to claim 5, further comprising generating a signal in a controller responsive to and indicative of said detecting the occurrence of the driving-start process.

11. The method according to claim 5, further comprising releasing a wheel brake device of the motor vehicle in response to and dependent on said detecting the occurrence of the driving-start process.

12. An apparatus for detecting a driving-start process of a motor vehicle that is starting to drive under control by a driver, comprising:
   an engine controller that is adapted to provide an engine torque and an engine rotational speed of an engine of the motor vehicle; and
   a control device that is connected to said engine controller, and that is adapted to calculate a time derivative of the engine torque and a time derivative of the engine rotational speed;
   wherein said control device is further adapted to compare the time derivative of the engine torque with a predefined engine torque change threshold valued, and to compare the time derivative of the engine rotational speed with a predefined negative engine speed change threshold value, and to signal the occurrence of the driving-start process of the motor vehicle when the time derivative of the engine torque is greater than or equal to the predefined torque change threshold value and the time derivative of the engine rotational speed is less than or equal to the predefined negative engine speed change threshold value.

13. The apparatus according to claim 12, further comprising a brake pressure modulation unit that is connected to said control device and to a brake device of the motor vehicle, wherein said brake pressure modulation unit is adapted to reduce a brake pressure applied to the brake device so as to release the brake device in response to the control device's signaling the occurrence of the driving-start process.

* * * * *